US010848258B2

United States Patent
Akkarakaran et al.

(10) Patent No.: US 10,848,258 B2
(45) Date of Patent: Nov. 24, 2020

(54) COORDINATING REFERENCE SIGNALS IN WIRELESS COMMUNICATION

(71) Applicant: QUALCOMM Incorporated, San Diego, CA (US)

(72) Inventors: Sony Akkarakaran, Poway, CA (US); Tao Luo, San Diego, CA (US); Renqiu Wang, San Diego, CA (US); Hao Xu, Beijing (CN); Wei Zeng, Cupertino, CA (US); Peter Gaal, San Diego, CA (US); Yi Huang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/871,901

(22) Filed: Jan. 15, 2018

(65) Prior Publication Data

US 2018/0205480 A1    Jul. 19, 2018

Related U.S. Application Data

(60) Provisional application No. 62/447,315, filed on Jan. 17, 2017.

(51) Int. Cl.
*H04J 11/00* (2006.01)
*H04L 5/00* (2006.01)
(Continued)

(52) U.S. Cl.
CPC ............ *H04J 11/005* (2013.01); *H04L 5/005* (2013.01); *H04L 5/0035* (2013.01);
(Continued)

(58) Field of Classification Search
None
See application file for complete search history.

(56) References Cited

U.S. PATENT DOCUMENTS 8,873,363 B2    10/2014    Parkvall et al.
9,237,473 B2    1/2016    Kazmi et al.
(Continued)

OTHER PUBLICATIONS

Huawei et al., "Symmetric RS Design for Duplexing Flexibility", 3GPP Draft; R1-1700416, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051207953, 5 Pages, Retrieved from the Internet: URL:http://www.3gpp.org/ftp/Meetings_3GPP_SYNC/RAN1/Docs/ [retrieved on Jan. 16, 2017].
(Continued)

*Primary Examiner* — Jutai Kao
(74) *Attorney, Agent, or Firm* — Loza & Loza LLP

(57) ABSTRACT

Various reference signal (RS) designs and arrangements for interference coordination and management in wireless communication are disclosed. Reference signals may be included in uplink (UL) and downlink (DL) transmissions for facilitating data demodulation and other purposes, and the locations of the reference signals within any given slot may depend on various factors. In some aspects of this disclosure, reference signals included in UL and/or DL transmissions of neighboring cells may be aligned in time and/or frequency to improve interference control and coordination between devices operating in different cells.

22 Claims, 13 Drawing Sheets

(51) Int. Cl.
  *H04W 72/04* (2009.01)
  *H04W 72/08* (2009.01)
  *H04L 5/14* (2006.01)
  *H04W 24/02* (2009.01)
  *H04W 24/10* (2009.01)

(52) U.S. Cl.
  CPC .......... *H04L 5/0053* (2013.01); *H04L 5/0073* (2013.01); *H04L 5/0091* (2013.01); *H04W 72/042* (2013.01); *H04W 72/0413* (2013.01); *H04W 72/0426* (2013.01); *H04W 72/0446* (2013.01); *H04W 72/082* (2013.01); *H04L 5/1469* (2013.01); *H04W 24/02* (2013.01); *H04W 24/10* (2013.01)

(56) References Cited

U.S. PATENT DOCUMENTS

| | | | | |
|---|---|---|---|---|
| 9,572,122 | B2 | 2/2017 | Wang et al. | |
| 9,832,629 | B2 | 11/2017 | Chen et al. | |
| 2014/0198747 | A1* | 7/2014 | Ouchi | H04L 5/0053 370/329 |
| 2015/0043522 | A1* | 2/2015 | Mobasher | H04B 7/0452 370/330 |
| 2015/0382336 | A1* | 12/2015 | Zhang | H04L 1/0003 370/329 |
| 2016/0262000 | A1 | 9/2016 | Koorapaty et al. | |
| 2016/0278030 | A1* | 9/2016 | Yi | H04W 16/32 |
| 2017/0013563 | A1* | 1/2017 | Yang | H04W 52/346 |
| 2017/0366377 | A1* | 12/2017 | Papasakellariou | H04L 5/003 |
| 2018/0091212 | A1* | 3/2018 | Lee | H04B 7/086 |
| 2019/0059086 | A1* | 2/2019 | Saxena | H04W 72/0453 |
| 2019/0260557 | A1* | 8/2019 | Zhang | H04L 5/0051 |

OTHER PUBLICATIONS

Intel Corporation: "Considerations on Reference Signal for Interference Management in Dynamic TDD", 3GPP Draft; R1-1700388 Considerations on Reference Signal for Interference Management in Dynamic TDD, 3rd Generation Partnership Project (3GPP), Mobile Competence Centre; 650, Route Des Lucioles ; F-, vol. RAN WG1, No. Spokane, WA, USA; Jan. 16, 2017-Jan. 20, 2017, Jan. 16, 2017 (Jan. 16, 2017), XP051207925, pp. 1-6, Retrieved from the Internet: URL: http://www.3gpp.org/ftp!Meetings_3GPP_SYNC/RAN1/Docs/ [retrieved on Jan. 16, 2017].

International Search Report and Written Opinion—PCT/US2018/013971—ISA/EPO—dated Apr. 6, 2018.

Nokia et al., "On Resource Block Grouping and Multi-Cell Coordination Aspects For Mixed Numerology Support", 3GPP Draft; R1-167261, 3rd Generation Partnership Project (3GPP), Mobile Competence Centre; 650, Route Des Lucioles ; F-06921 Sophia-Antipolis Cedex; France, vol. RAN WG1, No. Gothenburg, Sweden; Aug. 22, 2016-Aug. 26, 2016, Aug. 12, 2016 (Aug. 12, 2016), XP051132315, 10 Pages, Retrieved from the Internet: URL:http://www.3gpp.org/ftp/tsg_ran/WG1_RL_1/TSGR1_86/Docs/ [retrieved on Aug. 12, 2016].

NTT Docomo et al., "Mechanism of Data Channel for Dynamic TOO", 3GPP Draft; R1-1700635, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051208160, pp. 1-5, Retrieved from the Internet: URL:http://www.3gpp.org/ftp/Meetings_3GPP_SYNC/RAN1/Docs/ [retrieved on Jan. 16, 2017].

* cited by examiner

COORDINATING REFERENCE SIGNALS IN WIRELESS COMMUNICATION

PRIORITY CLAIM

This application claims priority to and the benefit of U.S. provisional patent application No. 62/447,315 filed in the United States Patent and Trademark Office on Jan. 17, 2017, the entire content of which is incorporated herein by reference as if fully set forth below in its entirety and for all applicable purposes.

TECHNICAL FIELD

The technology discussed below relates generally to wireless communication systems, and more particularly, to reference signal design for interference coordination in wireless communication.

INTRODUCTION

As the demand for mobile broadband access continues to increase, research and development continue to advance wireless communication technologies, for example, in interference management and coordination to advance and enhance the user experience with mobile communications.

In wireless communication, various reference signals may be transmitted to facilitate channel estimation, signal modulation/demodulation, cell search and initial acquisition, channel quality measurements, synchronization, etc. Some reference signals are used in downlink transmission, while some reference signals are used in uplink transmission. In some networks, communication in neighboring cells may cause interference between different channels and/or cells. In the next generation networks actively in development, channel and slot configurations are more dynamic than the current networks. Therefore, interference scenarios between channels and/or reference signals may become more complex.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication operable at a user equipment (UE). The UE determines a resource for transmitting a first reference signal for communication in a first cell to be in time alignment with a second reference signal for communication in a second cell. The first reference signal includes a first sequence, and the second reference signal includes a second sequence that is different from the first sequence. The UE further transmits or receives first data in a slot including the first reference signal in the first cell, such that the first reference signal is aligned in time with the second reference signal in the slot for transmitting second data in the second cell.

Another aspect of the present disclosure provides a method of wireless communication operable at a base station in a first cell. The base station determines, in collaboration with a base station in a second cell, a reference signal configuration for communication in the first cell. The base station of the first cell further configures a UE in the first cell based on the reference signal configuration to utilize a first reference signal for communication with the base station of the first cell such that the first reference signal is in time alignment with a second reference signal used for communication in the second cell.

Another aspect of the present disclosure provides a UE that includes a communication interface configured for wireless communication, a memory, and a processor operatively coupled with the communication interface and memory. The processor and the memory are configured to determine a resource for transmitting a first reference signal for communication in a first cell to be in time alignment with a second reference signal for communication in a second cell. The first reference signal includes a first sequence, and the second reference signal includes a second sequence that is different from the first sequence. The processor and the memory are further configured to transmit or receive first data in a slot including the first reference signal in the first cell, such that the first reference signal is aligned in time with the second reference signal in the slot for transmitting second data in the second cell.

Another aspect of the present disclosure provides a base station in a first cell. The base station includes a communication interface configured for wireless communication, a memory, and a processor operatively coupled with the communication interface and the memory. The processor and the memory are configured to determine, in collaboration with a base station in a second cell, a reference signal configuration for communication in the first cell. The processor and the memory are further configured to configure a UE in the first cell based on the reference signal configuration to utilize a first reference signal for communication with the base station of the first cell such that the first reference signal is in time alignment with a second reference signal used for communication in the second cell. These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
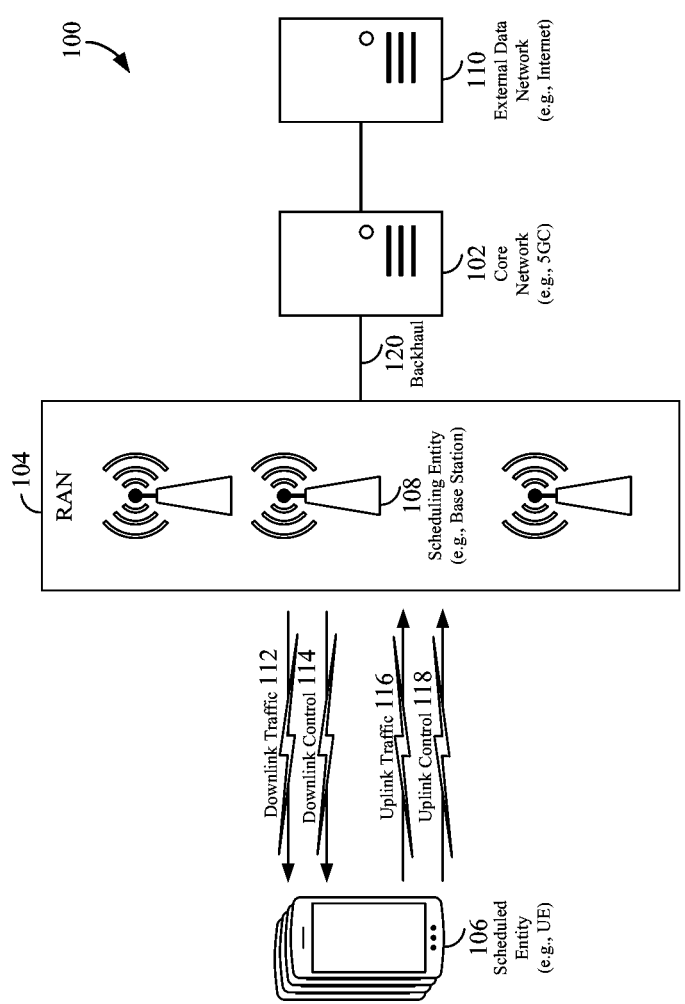
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, Snapdragon processors, modems and chipset, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure disclose various reference signal (RS) designs and arrangements for interference coordination and management in wireless communication. Next generation networks may utilize time division duplex (TDD) to support uplink (UL) and downlink (DL) communication in various slot types that may be dynamically changed from slot-to-slot. Devices in different cells may use different slot types in the same time slot. Reference signals may be included in the UL and DL transmissions for facilitating data demodulation and other purposes, and the locations of the reference signals within any given slot may depend on various factors. In some aspects of this disclosure, reference signals included in UL and/or DL transmissions of neighboring cells may be aligned in time and/or frequency to improve interference control and coordination between devices operating in different cells.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. The uplink traffic 116 may include reference signals for facilitating demodulation and decoding of the transmission. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The downlink traffic 112 and downlink control information 114 may include reference signals for facilitating demodulation and decoding of the transmissions.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
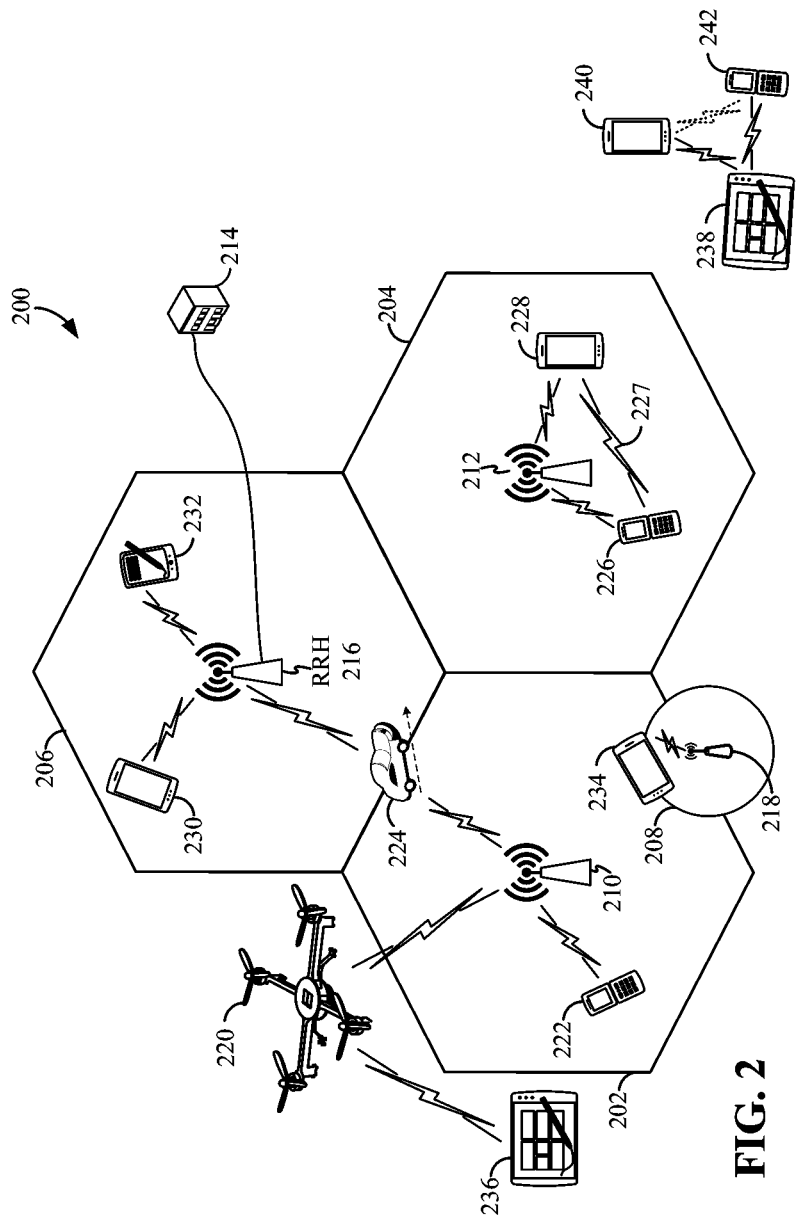
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. Interference between concurrent UL and/or DL transmissions in neighboring cells are managed and/or coordinated. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms and other suitable waveforms.

Within the present disclosure, a frame may refer to a data transmission unit of a predetermined duration. For example, a frame may have a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 402, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
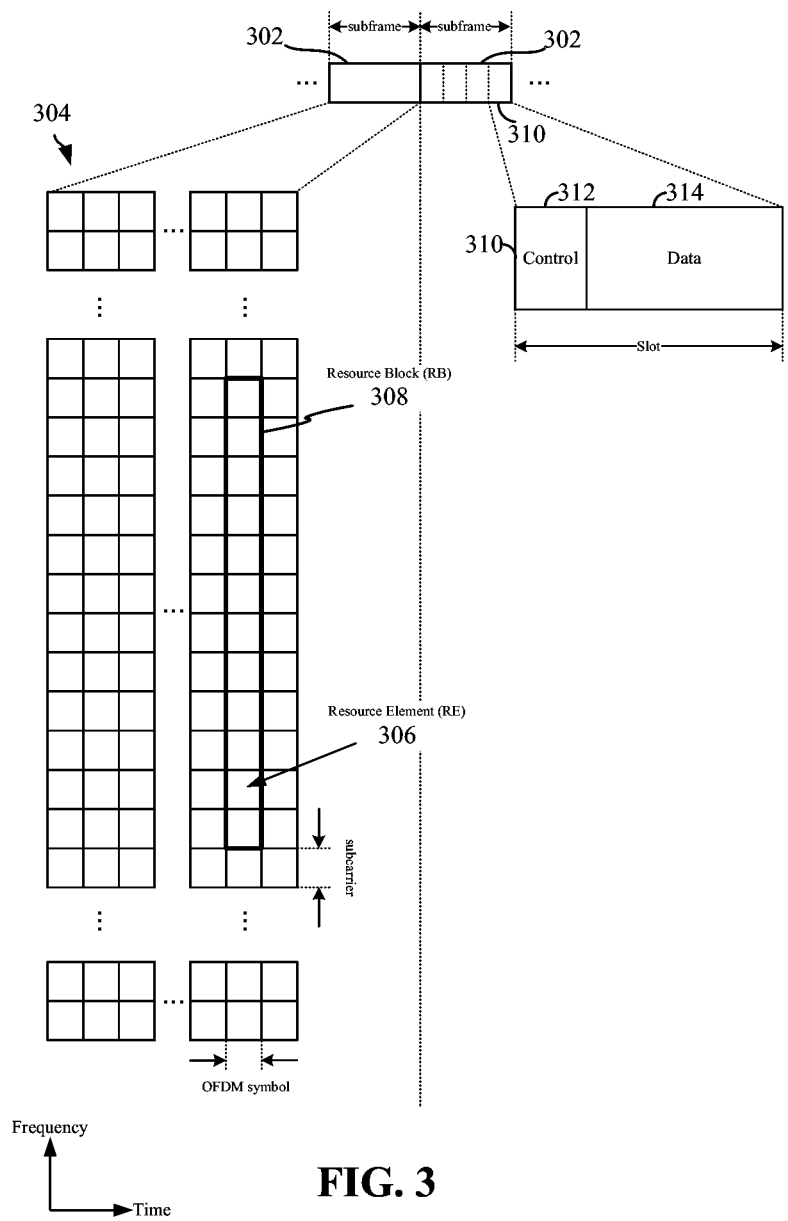
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308. In an exemplary DL channel, some REs may carry DL reference signals to facilitate channel estimation and demodulation at a UE. In an exemplary UL channel, some REs may carry DMRS and SRS to facilitate channel estimation. In general, DMRS may be used to estimate a channel to allow demodulation of data, and SRS (for UL) and CSI-RS (for DL) may be used to estimate a channel for purposes like rate/rank adaptation, beam management or precoding, etc. In some aspects of the disclosure, the purposes of these reference signals may be intermixed or repurposed. For example, if it is known that an SRS is sent on the same antenna port (i.e., experiences the same channel) as certain data transmissions, then the SRS-based channel estimate could be used to demodulate that data as well.

Figure 4:
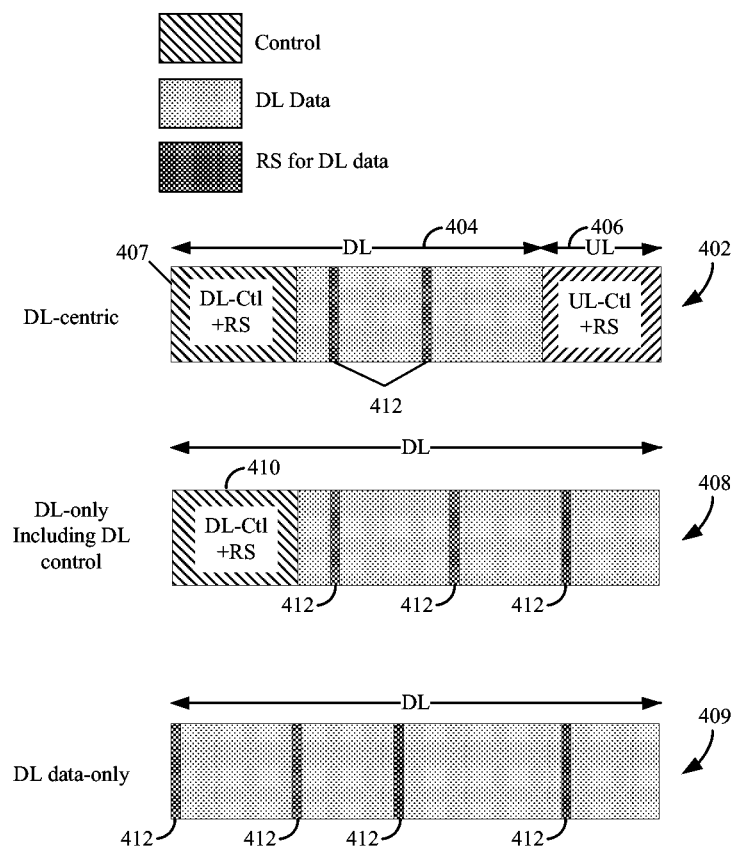
FIG. 4 is a diagram illustrating some examples of downlink slot types according to some aspects of the disclosure.

FIG. 4 illustrates some examples of downlink (DL) slot types according to some aspects of the disclosure. These DL slot types may be utilized by the base stations and UEs described in relation to FIGS. 1, 2, and 5-8 for dynamic TDD communication. In dynamic TDD communication, each time slot may be dynamically configured to use different slot or subframe types. In FIG. 4, each slot occupies certain time resources (e.g., OFDM symbols) in the horizontal direction and frequency resources (e.g., subcarriers) in the vertical direction.

An exemplary DL-centric slot 402 has a DL portion 404 and a UL control portion 406. The DL portion 404 generally occupies a major portion of the slot, and may include a DL control portion 407 and DL data portion.

An exemplary DL-only slot 408 has a DL data portion and may include a DL control portion 410, but has no UL portion. In some examples, the DL control portion and/or UL control portion of the DL-centric slot or DL-only slot may be located in other parts of a slot different than those shown in FIG. 4.

Another type of DL slot is a DL data-only slot 409 that contains only user data and has no control data. The DL data-only slot 409 carries no UL data.

In some aspects of the disclosure, one or more reference signals may be inserted into different portions of these DL slots. For example, one or more reference signals 412 may be included in the DL data portion. In some examples, the DL control portion and UL control portion may also include one or more reference signals. These reference signals and their positions in the time-frequency resource grid are known to the UEs in a cell and hence can be used for various purposes, for example, channel estimation, signal modulation/demodulation, cell search and initial acquisition, channel quality measurements, synchronization, etc. Some examples of DL reference signals are cell-specific reference signals (CRS), UE-specific reference signals, demodulation reference signals (DM-RS), positioning reference signals (PRS), channel-state information (CSI) reference signals (CSI-RS), etc. Some examples of UL reference signals are demodulation reference signals (DM-RS), phase tracking reference signals (PTRS), and sounding reference signals (SRS).

Figure 5:
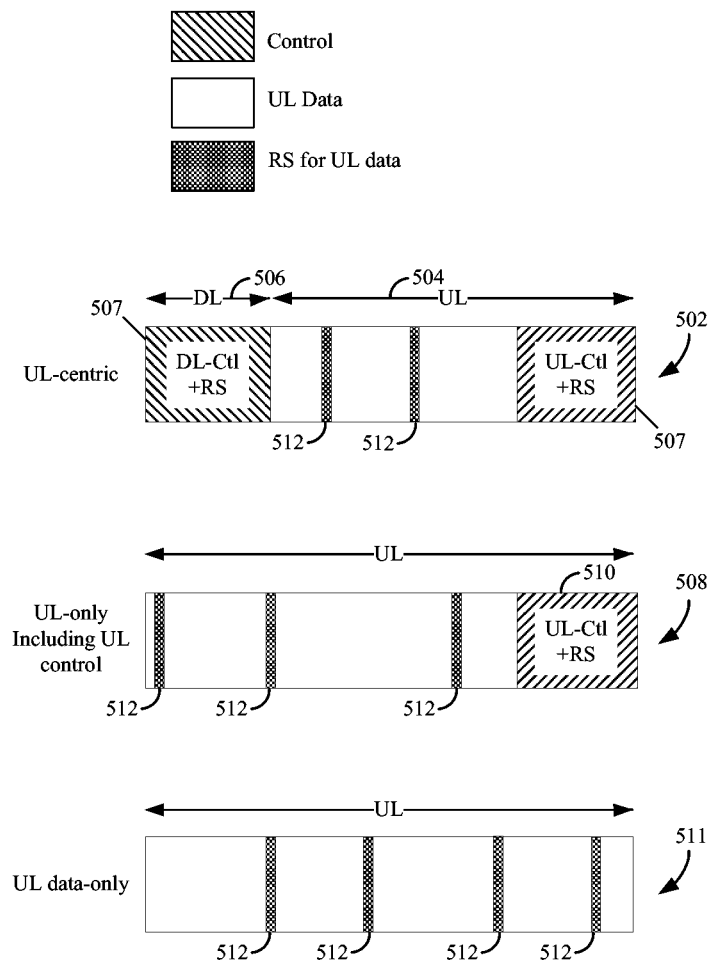
FIG. 5 is a diagram illustrating some examples of uplink slot types according to some aspects of the disclosure.

FIG. 5 illustrates some examples of UL slot types according to some aspects of the disclosure. These UL slot types may be utilized by the base stations and UEs described above in relation to FIGS. 1, 2, and 5-8 for dynamic TDD communication. An exemplary UL-centric slot 502 has an UL portion 504 and a DL control portion 506. The UL portion 504 generally occupies a major portion of the slot, and may include an UL control portion 507.

An exemplary UL-only slot 508 carries UL data and may include an UL control portion 510, but no DL portion. In other examples, a DL control portion and/or an UL control portion may be located in other parts of the UL-centric slot and UL-only slot different from those shown in FIG. 5.

Another type of UL slot is an UL data-only slot 511 that contains only UL data and no control data or DL data.

One or more reference signals 512 may be inserted into different portions of these UL slots illustrated in FIG. 5. In some examples, an UL slot (e.g., UL-centric or UL-only) may have an UL control portion including UL control signals such as a scheduling request (RS) at the beginning of the UL portion that are not shown in FIG. 5. The beginning of an UL control portion, if used, would begin from the left side of a slot in FIG. 5. In some examples, one or more reference signals 512 may be included in the UL data portion. The DL control portion and UL control portion may also include one or more reference signals. These reference signals and their positions in the time-frequency resource grid are known to the UEs in a cell and hence can be used for various purposes, for example, channel estimation, signal modulation/demodulation, cell search and initial acquisition, channel quality measurements, synchronization, etc.

Referring to FIG. 2, in a radio access network 200, communications in different cells (e.g., cells 202, 204, 206) may use different slot types as described above in FIGS. 4 and 5 during the same time slot or frame. The location of the reference signal (RS) in a slot may be different based on the slot type used for the slot, and a slot may contain one or more reference signals. Further, the DL and/or UL control portion (if used) of a slot may have a configurable duration and may have different durations in different cells. In some examples described in more detail below, the reference signals utilized in a same slot in different cells may be aligned with one another to facilitate RS interference control between the cells. The cells may be aligned in timing (i.e., synchronized) so that the slot boundaries also align between cells.

In some aspects of the disclosure, the reference signal(s) of a slot may be used to facilitate data demodulation and related functions. The locations for reference signals for data demodulation depend on many factors. In one example, an RS may be front-loaded (i.e., placed at or near the beginning of a data portion) to improve a demodulation timeline. It is because placing the RS near the front of the data portion allows the receiving device to acquire the information (e.g., RS) needed to demodulate the data earlier in the slot. In another example, when the data portion occupies a long duration (e.g., multiple OFDM symbols), placing the RS later or near the end of the data portion may help demodulation in high Doppler scenarios.

The presence of other control signals (e.g., RS for control information) in the same slot can affect the placement of the RS for data demodulation. In some examples, other RS (e.g., for channel estimation, measurements, or synchronization) may also be usable for data demodulation. For example, RS for DL/UL control, SRS, CSI-RS, or other measurement RS may be used for data demodulation. Therefore, the presence of other RS may impact the duration of the data portion and thus the placement of RS for data demodulation (e.g., DM-RS). In some examples, puncturing by CSI-RS or MRS (measurement RS) may affect the placement of the RS for data demodulation.

The above description of RS is merely illustrative in nature. In other aspects of the disclosure, UL and DL slots may have other RS designs and combinations.

Figure 6:
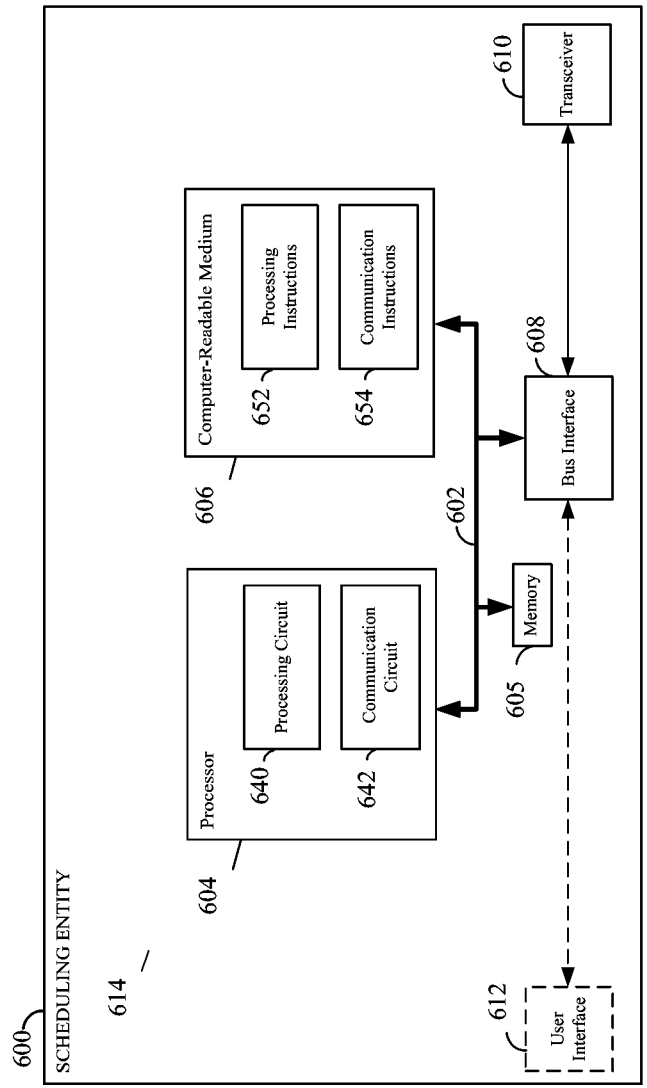
FIG. 6 is a block diagram illustrating an example of a hardware implementation for a scheduling entity according to some aspects of the disclosure.

FIG. 6 is a block diagram illustrating an example of a hardware implementation for a scheduling entity 600 employing a processing system 614. For example, the scheduling entity 600 may be a user equipment (UE) as illustrated in any one or more of FIGS. 1, 2, and/or 8. In another example, the scheduling entity 600 may be a base station as illustrated in any one or more of FIGS. 1, 2, and/or 8.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes and procedures described below and illustrated in FIGS. 8-13.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

In some aspects of the disclosure, the processor 604 may include circuitry (e.g., a processing circuit 640 and a communication circuit 642) configured to implement one or more of the functions described below in relation to FIGS. 8-13.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include software (e.g., processing instructions 652 and communication instructions 654) configured to implement one or more of the functions described in relation to FIGS. 5-13.

Figure 7:
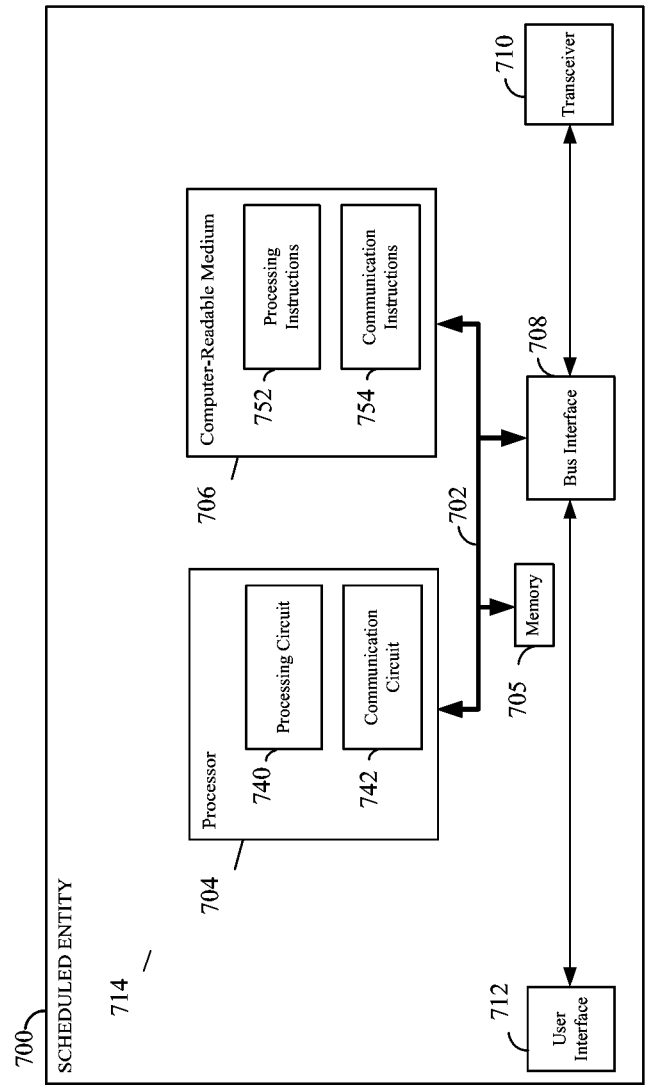
FIG. 7 is a block diagram illustrating an example of a hardware implementation for a scheduled entity according to some aspects of the disclosure.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1, 2, and/or 8.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described below and illustrated in FIGS. 3-13.

In some aspects of the disclosure, the processor 704 may include circuitry (e.g., a processing circuit 740 and a communication circuit 742) configured to implement one or more of the functions described below in relation to FIGS. 8-13. In one or more examples, the computer-readable storage medium 706 may include software (e.g., processing instructions 752 and communication instructions 754) configured to implement one or more of the functions described in relation to FIGS. 5-13.

Figure 8:
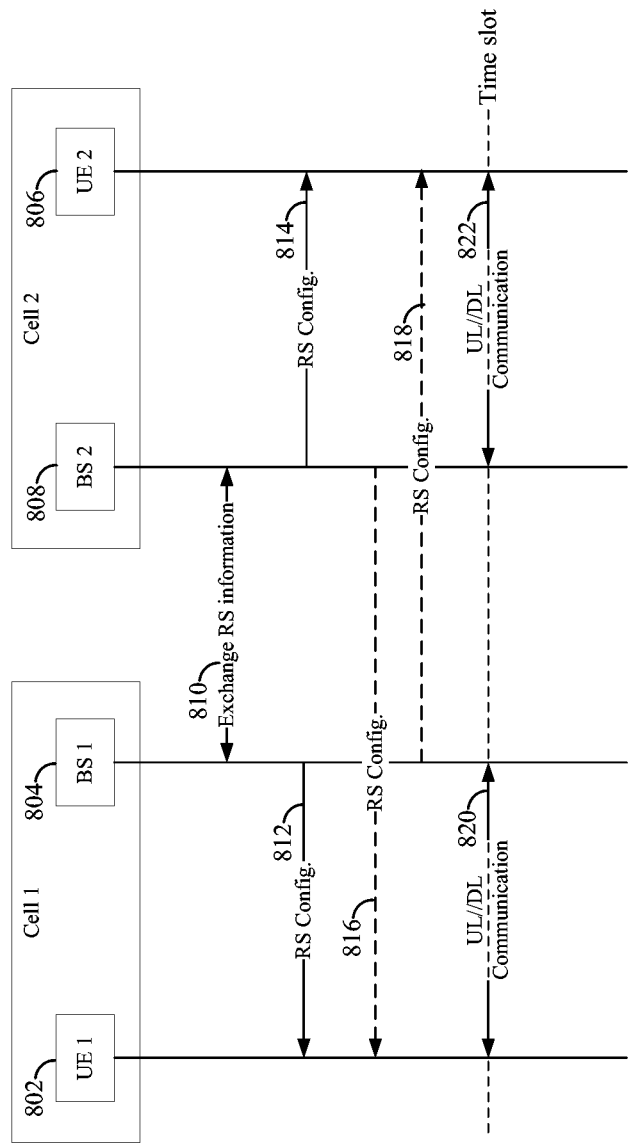
FIG. 8 is a diagram illustrating a process for coordinating reference signal transmissions in a time slot between cells according to some aspects of the disclosure.

FIG. 8 is a diagram illustrating a process 800 for coordinating RS transmissions between cells according to some aspects of the disclosure. In a first cell (cell 1), a first UE 802 may camp on a first base station 804. In a second cell (cell 2), a second UE 806 may camp on a second base station 808. Cell 1 and cell 2 may be neighboring cells (e.g., cells 102, 104, and 106 of FIG. 1) and may communicate with each other via a wired and/or wireless communication link. Because the base stations are neighbors, the first UE 802 may be able to receive transmissions from the second UE 806 and/or second base station 808. These transmissions may cause interference at the first UE 802. Similarly, transmissions from the first UE 802 and/or transmissions from the first base station 804 may cause interference at the second UE 806 and/or second base station 808.

In some examples, the first base station 804 and second base station 808 may communicate with each other (e.g., via an X2 interface) to exchange signaling information, mobility information, and other information including RS timing or configuration 810 in the respective cells. Based on the exchanged information, the base stations can determine and align their reference signals (RSes) used in their respective cells (e.g., cell 1 and cell 2). In an exemplary slot, one or more RSes used in neighboring cells may be aligned in time and/or frequency to manage or mitigate interference between the cells. In one aspect of the disclosure, the first base station 804 may transmit a first RS configuration 812 to the first UE 802 using, for example, a radio resource control (RRC) configuration message. Similarly, the second base station 808 may transmit a second RS configuration 814 to the second UE 806 using, for example, an RRC configuration message.

In some examples, the base station may transmit the RS configuration using a downlink control channel. This approach can provide more dynamic and faster RS configuration communication than using an RRC configuration message. An RRC configuration is a semi-static configuration that has a longer signaling overhead than using the downlink control channel.

The RS configurations 812 and 814 may configure the first UE and second UE to align one or more of their RSes in the same time slot. For example, the RS configuration messages can configure the first UE 802 and second UE 806 to transmit their RSes at substantially the same time in a same slot. In one aspect of the disclosure, the aligned RSes of the UEs may be located at the same symbol(s) (e.g., OFDM symbols) of a slot. To this end, the cells are synchronized in their slot boundary. The base stations may configure the RS semi-statically or dynamically. Semi-static configuration means that a base station does not need to signal a UE to configure the RS timing or alignment in each slot or transmission. An example of semi-static configuration is an RRC configuration. Dynamic configuration means that the base station may configure and reconfigure the RS in every slot or transmission using a DL control channel.

In some aspects of the disclosure, the first UE 802 may receive an RS configuration 816 from the second base station 808, and/or the second UE 806 may receive an RS configuration 818 from the first base station 804. In some examples, the cells may communicate with each other and settle on an RS configuration that may be sent to the UE by its own cell. In some examples, the second base station 808 (second cell) may pass configuration information to the first base station 804 (first cell), which may then convey it to its UE. Alternatively, the second base station 808 may directly talk to the UE of the first cell if the UE is configured for Coordinated Multi Point (CoMP) operation.

Figure 9:
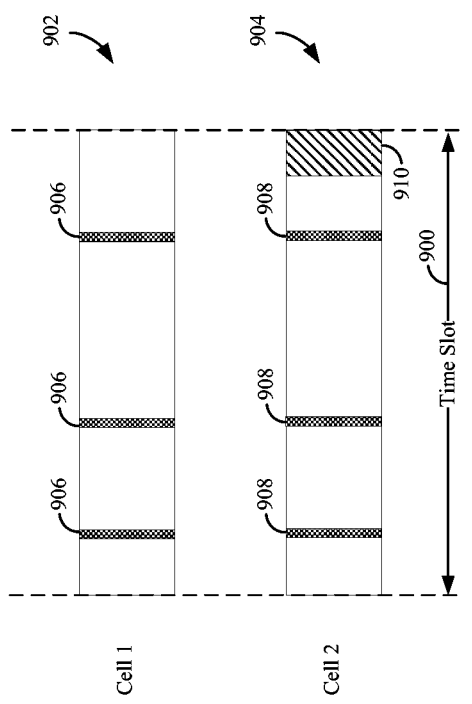
FIG. 9 is a block diagram illustrating an example of reference signal alignment between different cells according to some aspects of the disclosure.

FIG. 9 is a block diagram illustrating an example of RS alignment between different cells according to some aspects of the disclosure. In a time slot 900, the first UE 802 of cell 1 may communicate with the first base station 804 using a first slot type 902. In the same time slot 900, the second UE 806 of cell 2 may communicate with the second base station 808 using a second slot type 904. In one example, the first slot type 902 may be a DL only slot, and the second slot type 904 may be a DL centric slot including an UL portion 910. Based on the RS configurations, one or more RSes 906 of the first slot type 902 may align in time and/or frequency with one or more RSes 908 of the second slot type 904. In some examples, the first slot type may be the same as or different from the second slot type. In one example, referring to FIG. 8, the first UE 802 may transmit UL data 820 to the base station 804, while the second UE 806 may receive/transmit DL/UL data 822 from/to the base station 808. In another example, the first UE 802 may receive DL data 820 from the base station 804, while the second UE 806 may receive/transmit DL/UL data 822 from/to the base station 808. In some examples, a base station may send DL data using one of the DL slot types shown in FIG. 4, and a UE may send UL data using one of the UL slot types shown in FIG. 5. In some examples, neighbor cells may use the same slot type in the same time slot.

Figure 10:
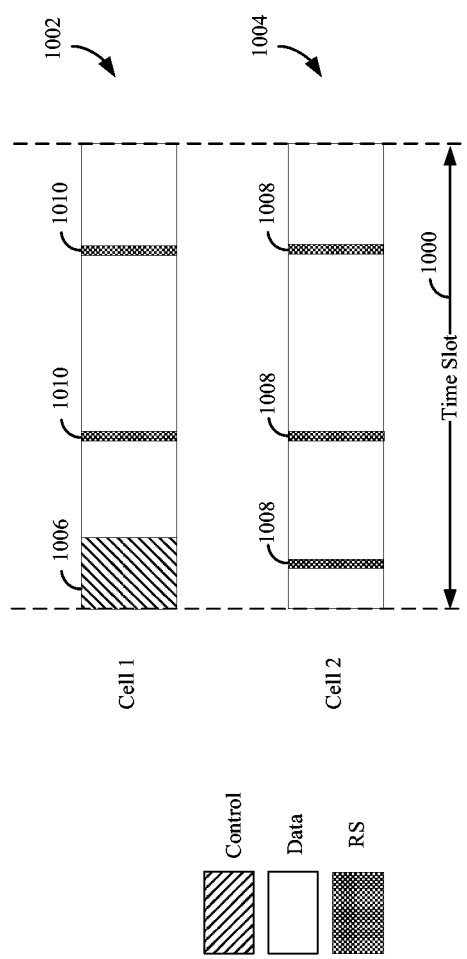
FIG. 10 is a block diagram illustrating an example of partial reference signal alignment between different cells according to some aspects of the disclosure.

FIG. 10 is a block diagram illustrating an example of partial RS alignment between cells according to some aspects of the disclosure. In some examples, not all RSes used in a slot may be aligned between cells that are aligned in slot boundary. In an exemplary time slot 1000, the first UE 802 of cell 1 may communicate with the first base station 804 using a first slot type 1002. In the same time slot 1000, the second UE 806 of cell 2 may communicate with the second base station 808 using a second slot type 1004. In this example, the first slot type 1002 has a control portion 1006, but the second slot type 1004 does not have a control portion. The control portion 1006 overlaps one of the RSes 1008 of the second slot type 1004 and prevents the complete one-to-one alignment of all RSes in the same slot. In this case, only the RSes 1010 in the data portion of the first slot type 1002 may be aligned with the corresponding RSes 1008 of the second slot type 1004.

In general, better RS alignment may be achieved when similar slot types are used between the cells. For example, a first cell may use an UL data-only slot, while a second cell may use a DL data-only slot. Because both slots have no control portion, it allows better RS alignment. In another example, the first cell may use an UL-centric slot, while the second cell may use a DL-centric slot. In this case, the data portion of the UL-centric slot may be similar or substantially the same as the data portion of the DL-centric slot. Therefore, better RS alignment may be achieved between the UL-centric and DL-centric slots.

Figure 11:
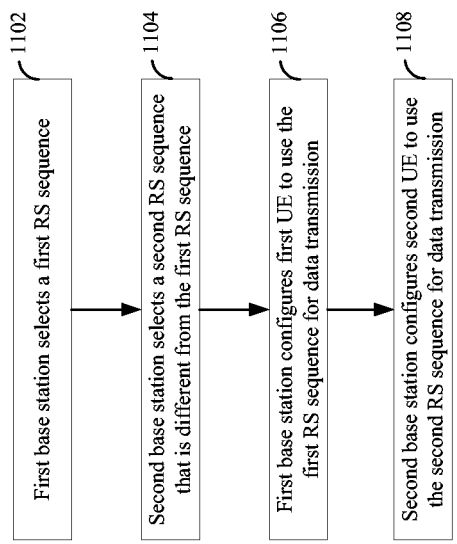
FIG. 11 is a flow chart illustrating an exemplary process for determining reference signals used in different cells according to some aspects of the disclosure.

FIG. 11 is a flow chart illustrating an exemplary process 1100 for determining RS used in different cells according to some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduling entity 600 illustrated in FIG. 6 and/or scheduled entity 700 illustrated in FIG. 7. In some examples, the process 1100 may be carried out by any suitable apparatus or means for carrying out the functions or algorithm described below.

When reference signals (RSes) used in different cells are orthogonal to each other, the orthogonality of the RSes enable a UE to identify and/or remove the interfering RS from its own RS. In some aspects of the disclosure, the RSes may be based on RS sequences that are derived from a virtual cell-ID that is configured to be the same across the neighbor cells to ensure orthogonality of the RSes. In some examples, the sequences may be partitioned into a first group for use on DL communication and a second group for use on UL communication. In some examples, the RSes may be recovered using CDMA demultiplexing algorithms or other techniques.

At block 1102, a first base station 804 of cell 1 may select a first RS sequence for UL or DL transmission in cell 1. For example, the first RS sequence may be a CDMA sequence. At block 1104, a second base station 808 of cell 2 may select a second RS sequence that is different from the first RS sequence for UL or DL transmission in cell 2. For example, the first RS sequence and second RS sequence may be orthogonal to each other. To reduce interference between RSes of different cells, the UL and DL transmissions in the cells may utilize RS sequences that are orthogonal such that the receiver can reject the unwanted RS signals from other cells' transmissions. In some aspects of the disclosure, non-orthogonal sequences may be used, and the sequences can be designed to minimize interference while allowing multiplexing of more UEs than would be allowed using only orthogonal sequences.

At block 1106, the first base station 804 may configure a first UE 802 in cell 1 to use the first RS sequence for UL or DL communication. At block 1108, the second base station 808 may configure a second UE 806 in cell 2 to use the second RS sequence for UL or DL communication. The UL/DL communications may be of the same or different slot types in different cells in a same time slot. The slot types may be the same as those described in relation to FIGS. 4 and 5. In some examples, the base stations may coordinate their UL and DL RSes to be drawn from the same set of orthogonal sequences. Therefore, the same RS sequence (e.g., orthogonal sequence) will be not used in both cells.

In some examples, the same sequences may be shared by different transmission waveforms (e.g., OFDM and DFT-S-OFDM waveforms) to allow orthogonalization regardless of waveform selected for data transmission. For example, while OFDM can provide high and robust transmission bandwidth, OFDM waveforms may suffer from large variations in the instantaneous power of the transmitted signal. Thus, in some networks, a single-carrier transmission scheme can be implemented using DFT-spread OFDM (DFT-S-OFDM), also known as SC-FDMA (Single Carrier FDMA), as an alternative to multi-carrier OFDM transmission, especially for the uplink. Compared to OFDM, DFT-S-OFDM has smaller variations in the instantaneous power of the transmitted signal ("single carrier" property), lower complexity in equalization in the frequency domain, and potentially more flexible bandwidth assignment. In a network using both OFDM and DFT-S-OFDM, their RSes may be aligned as described above in relation to FIGS. 8-11, and interference between these RSes may be mitigated or avoided using orthogonalizing sequences.

In other examples, the above-described RS alignment and coordination schemes may be used in any combinations of DL/UL transmission between neighboring cells. In some examples, RS alignment between cells may include DL-DL and UL-UL alignments for RS used for control demodulation if the RS location in frequency and the number of control OFDM symbols align appropriately across cells. In such cases, the aligned RSes may be orthogonalized (e.g., using orthogonal sequences) across the neighboring cells.

In other examples, if the RSes of DL and UL control channels align in time and frequency across different cells (e.g., CSI-RS or MRS on DL aligns with UL SRS), then they may be orthogonalized as well to mitigate RS interference.

In some examples, the RSes from different cells may not necessarily be orthogonal, but the cells may exchange information about the RSes used in the respective cells, so that the interfering RS(es) from another cell can be determined and canceled out. For example, the cells may exchange information on the specific sequences being used in specific slots and/or RBs. In another example, the cells may exchange information only the set of sequences that will be used in an upcoming set of slots either in the whole band or on a per sub-band (or bandwidth-part) basis. In similar fashions, a UE can cancel DL interference from a neighboring base station or UE, and a base station can cancel UL interference from a neighboring UE or base station. In some examples, the above described RS interference mitigation schemes may be applied to both RSes for data and RSes for control information in a slot.

Figure 12:
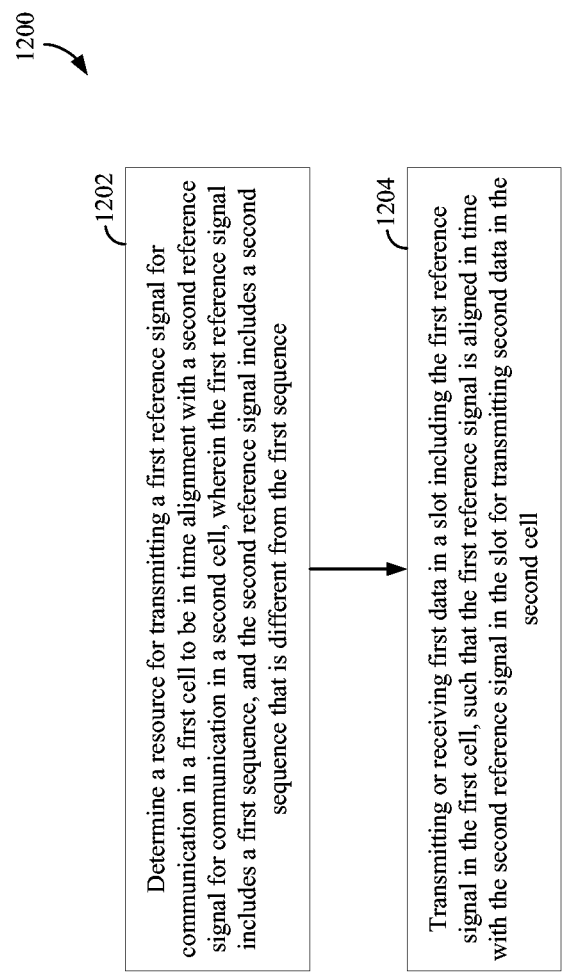
FIG. 12 is a flow chart illustrating an exemplary process for coordinating reference signal transmissions between cells according to some aspects of the present disclosure.

FIG. 12 is a flow chart illustrating an exemplary process 1200 for coordinating reference signals between cells in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 700 illustrated in FIG. 7. In some examples, the process 1200 may be carried out by any suitable apparatus, UE, or means for carrying out the functions or algorithm described below.

At block 1202, a UE 802 (see FIG. 8) determines a resource for transmitting a first reference signal for communication in a first cell (cell 1) to be in time alignment with a second reference signal for communication in a second cell (cell 2). For example, the UE may utilize a processing circuit 740 (see FIG. 7) to determine the reference signal that is similar to the reference signals 906 and 908 described above in relation to FIG. 9. The first reference signal may be based on a first sequence, and the second reference signal may be based on a second sequence that is different from the first sequence. In some aspects of the disclosure, the first reference signal and second reference signal may be orthogonal to each other.

In some aspects of the disclosure, the UE may receive a reference signal configuration (e.g., RS configuration 812) from a base station, and the reference signal configuration may include information for determining the first reference signal. For example, the reference signal configuration may be an RRC configuration message that provides RS timing and sequences that can be used in the cell.

At block 1204, the UE may communicate (e.g., transmit or receive) first data in a slot including the first reference signal in the first cell, such that the first reference signal is aligned in time with the second reference signal in the same slot for transmitting second data transmitted in the second cell. The UE may utilize a communication block 742 and a transceiver 710 (see FIG. 7) to communicate the first data and reference signal. For example, the first data may be the UL/DL communication 820, and the second data may be the UL/DL communication 822 as described in connection with FIG. 8 above. In some examples, the first data and second data may be transmitted in a same time slot using a same slot type or different slot types (e.g., UL-only, DL-only, UL-centric, and DL-centric) as described in relation to FIGS. 4 and 5 above.

Figure 13:
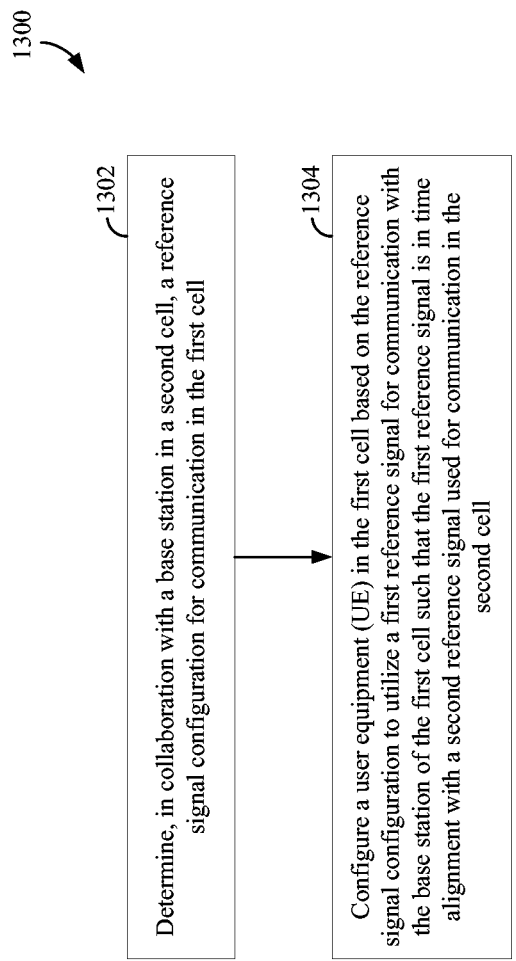
FIG. 13 is a flow chart illustrating another exemplary process for coordinating reference signal transmissions between cells in accordance with some aspects of the present disclosure.

FIG. 13 is a flow chart illustrating an exemplary process 1300 for coordinating reference signals between cells in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 600 illustrated in FIG. 6. In some examples, the process 1300 may be carried out by any suitable apparatus, base station, or means for carrying out the functions or algorithm described below.

At block 1302, a base station 804 in a first cell (cell 1) determines, in collaboration with a base station 808 in a second cell (cell 2), a reference signal configuration for communication in the first cell. For example, the base station of the first cell may utilize a communication block 642 and a transceiver 610 (see FIG. 6) to exchange RS information with the base station of the second cell. For example, the base stations may exchange mobility information, slot types, and other information including RS timing or configuration in the respective cells.

At block 1304, the base station 804 of the first cell configures a UE in the first cell based on the reference signal configuration to utilize a first reference signal for communication with the base station of the first cell such that the first reference signal is in time alignment with a second reference signal used for communication in the second cell. For example, the base station 804 may transmit an RS configuration 812 to the UE 802 of cell 1, and the base station 808 may transmit an RS configuration 814 to the UE 806 of cell 2. In this case, the base stations configure their respective UEs to use different reference signals that are aligned in time and frequency. In one example, the reference signals are orthogonal to each other. In some aspects of the disclosure, the base station may utilize a processing circuit 640 to determine the RS configuration, and a communication circuit 642 and a transceiver 610 to communicate with the UE.

In one configuration, the apparatus 600 and/or 700 for wireless communication includes various means configured to perform the functions and procedures recited in relation to FIGS. 1-13. In another aspect, the aforementioned means may be a circuit or any apparatus configured to perform the functions recited by the aforementioned means.

Of course, in the above examples, the circuitry included in the processor 604 or 704 is merely provided as an example, and other means for carrying out the described functions may be included within various aspects of the present disclosure, including but not limited to the instructions stored in the computer-readable storage medium 606/706, or any other suitable apparatus or means described in any one of the FIGS. 1, 2, and/or 8, and utilizing, for example, the processes and/or algorithms described herein in relation to FIGS. 8-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a user equipment (UE) comprising:
   camping on a base station of a first cell;
   receiving, directly from a base station of a second cell, a reference signal configuration that includes information for determining a resource for transmitting a first reference signal for communication in the first cell to be in time and frequency alignment with a second reference signal for communication in the second cell, wherein the first reference comprises a first sequence, and the second reference signal comprises a second sequence that is different from the first sequence; and
   transmitting or receiving first data in a slot comprising the first reference signal in the first cell, such that the first reference signal uses a time-frequency resource that is at least partially used by the second reference signal in the slot for transmitting second data in the second cell.

2. The method of claim 1, wherein the first reference signal based on the first sequence and the second reference signal based on the second sequence are orthogonal to each other.

3. The method of claim 1, further comprising:
   receiving, from the base station of the first cell, a reference signal configuration that includes information for determining the resource of the first reference signal.

4. The method of claim 1, wherein the first reference signal comprises a demodulation reference signal for demodulating the first data.

5. The method of claim 1, wherein the first reference signal comprises a plurality of reference signals time-multiplexed with the first data.

6. The method of claim 1, wherein the transmitting or receiving comprises:
   transmitting or receiving the first data in a first slot type that is different from a second slot type utilized for transmitting the second data in the second cell.

7. The method of claim 6, wherein the first slot type corresponds to an uplink slot type, and the second slot type corresponds to a downlink slot type.

8. A method of wireless communication operable at a base station in a first cell, comprising:
   exchanging reference signal information with a base station of a second cell to determine a reference signal configuration for communication in the first cell, the referencesignal information configured to align reference signal transmissions in the first cell and the second cell in time and frequency;
   configuring a user equipment (UE) in the first cell based on the reference signal configuration to utilize a first reference signal for communication with the base station of the first cell such that the first reference signal uses a time-frequency resource that is at least partially used by a second reference signal used for communication in the second cell; and
   transmitting, directly to a UE in the second cell, a reference signal configuration of the second reference signal.

9. The method of claim 8, wherein the first reference signal comprises a first sequence, and the second reference signal comprises a second sequence that is different from the first sequence.

10. The method of claim 9, wherein the first reference signal and the second reference signal are orthogonal to each other.

11. The method of claim 8, wherein the configuring comprises:

transmitting a control message comprising the reference signal configuration to the UE of the first cell.

12. A user equipment (UE), comprising:
a communication interface configured for wireless communication;
a memory; and
a processor operatively coupled with the communication interface and memory,
wherein the processor and the memory are configured to:
camp on a base station of a first cell;
receive, directly from a base station of a second cell, a reference signal configuration that includes information for determining a resource for transmitting a first reference signal for communication in the first cell to be in time and frequency alignment with a second reference signal for communication in the second cell, wherein the first reference signal comprises a first sequence, and the second reference signal comprises a second sequence that is different from the first sequence; and
transmit or receive first data in a slot comprising the first reference signal in the first cell, such that the first reference signal uses a time-frequency resource that is at least partially used by the second reference signal in the slot for transmitting second data in the second cell.

13. The UE of claim 12, wherein the first reference signal based on the first sequence and the second reference signal based on the second sequence are orthogonal to each other.

14. The UE of claim 12, wherein the processor and the memory are further configured to:
receive, from the base station of the first cell, a reference signal configuration that includes information for determining the resource of the first reference signal.

15. The UE of claim 12, wherein the first reference signal comprises a demodulation reference signal for demodulating the first data.

16. The UE of claim 12, wherein the first reference signal comprises a plurality of reference signals time-multiplexed with the first data.

17. The UE of claim 12, wherein the processor and the memory are further configured to:
transmit or receive the first data in a first slot type that is different from a second slot type utilized for transmitting the second data in the second cell.

18. The UE of claim 17, wherein the first slot type corresponds to an uplink slot type, and the second slot type corresponds to a downlink slot type.

19. A base station in a first cell, comprising:
a communication interface configured for wireless communication;
a memory; and
a processor operatively coupled with the communication interface and the memory,
wherein the processor and the memory are configured to:
determine, in collaboration with a base station in a second cell to determine a reference signal configuration for communication in the first cell the reference signal information configured to align reference signal transmissions in the first cell and the second cell in time and frequency;
configure a user equipment (UE) in the first cell based on the reference signal configuration to utilize a first reference signal for communication with the base station of the first cell such that the first reference signal uses a time-frequency resource that is at least partially used by a second reference signal used for communication in the second cell; and
transmit, directly to a UE in the second cell, a reference signal configuration of the second reference signal.

20. The base station of claim 19, wherein the first reference signal comprises a first sequence, and the second reference signal comprises a second sequence that is different from the first sequence.

21. The base station of claim 20, wherein the first reference signal and the second reference signal are orthogonal to each other.

22. The base station of claim 19, wherein the processor and the memory are further configured to:
configure the UE by transmitting a control message comprising the reference signal configuration to the UE of the first cell.

* * * * *